US012682362B2

(12) United States Patent
Bitaab et al.

(10) Patent No.: US 12,682,362 B2
(45) Date of Patent: Jul. 14, 2026

(54) AUTOMATED DOMAIN CRAWLER AND CHECKOUT SIMULATOR FOR PROACTIVE AND REAL-TIME SCAM WEBSITE DETECTION

(71) Applicant: PAYPAL, INC., San Jose, CA (US)

(72) Inventors: Marzieh Bitaab, Chandler, AZ (US); Adam Oest, Fountain Hills, AZ (US); Muhammad Saad, Phoenix, AZ (US)

(73) Assignee: PAYPAL, INC., San Jose, CA (US)

( * ) Notice: Subject to any disclaimer, the term of this patent is extended or adjusted under 35 U.S.C. 154(b) by 267 days.

(21) Appl. No.: 18/521,909

(22) Filed: Nov. 28, 2023

(65) Prior Publication Data

US 2025/0173738 A1 May 29, 2025

(51) Int. Cl.
  *G06Q 30/018* (2023.01)
  *H04L 9/40* (2022.01)
(52) U.S. Cl.
  CPC ..... *G06Q 30/0185* (2013.01); *H04L 63/1483* (2013.01)
(58) Field of Classification Search
  CPC .......................... G06Q 30/0185; H04L 63/1483
  See application file for complete search history.

(56) References Cited

U.S. PATENT DOCUMENTS

| | | | |
|---|---|---|---|
| 2006/0253580 A1 | 11/2006 | Dixon et al. | |
| 2006/0253583 A1 | 11/2006 | Dixon et al. | |
| 2012/0185942 A1 | 7/2012 | Dixon et al. | |
| 2013/0263272 A1* | 10/2013 | Banerjee | H04L 63/1483 |
| | | | 726/25 |
| 2014/0189808 A1 | 7/2014 | Mahaffey et al. | |
| 2016/0191548 A1* | 6/2016 | Smith | G06F 21/554 |
| | | | 726/23 |
| 2020/0311790 A1* | 10/2020 | Keren | G06Q 20/4016 |
| 2021/0248624 A1 | 8/2021 | Keren et al. | |
| 2022/0101326 A1* | 3/2022 | Kim | G06Q 20/4016 |
| 2022/0327167 A1* | 10/2022 | Kravitz | G06F 16/951 |

(Continued)

OTHER PUBLICATIONS

Amarasekara, Bede Ravindra, and Anuradha Mathrani. "Controlling risks and fraud in affiliate marketing: A simulation and testing environment." 2016 14th Annual Conference on Privacy, Security and Trust (PST). IEEE, 2016. (Year: 2016).*

*Primary Examiner* — Corey Russ
(74) *Attorney, Agent, or Firm* — Haynes and Boone, LLP

(57) ABSTRACT

There are provided systems and methods for an automated domain crawler and checkout simulator for proactive and real-time scam website detection. A service provider, such as an online transaction processor, may provide a domain crawler and checkout simulator that may be used to detect scam websites when registered and/or configured to utilize intermediary webpages of other domains to perpetrate fraud or scams on customers. The domain parser may detect new domain registrations and may parse through their corresponding websites to identify those that include checkout options or other processing flows that proceed through steps and use a service or feature of a service provider, including account usage for electronic transaction processing. The checkout simulator may then simulate a user's experience through the checkout to determine if domain redirections occur. If so, those redirections may be checked to identify usage of a merchant account having been flagged for scams.

20 Claims, 7 Drawing Sheets

(56) References Cited

U.S. PATENT DOCUMENTS

| | | | |
|---|---|---|---|
| 2023/0319038 A1* | 10/2023 | Gupta | H04L 63/0876 |
| | | | 705/44 |
| 2023/0325841 A1* | 10/2023 | Sanchez Rola | G06Q 30/0185 |
| | | | 705/44 |
| 2024/0330960 A1* | 10/2024 | Bitaab | G06Q 30/0185 |

* cited by examiner

AUTOMATED DOMAIN CRAWLER AND CHECKOUT SIMULATOR FOR PROACTIVE AND REAL-TIME SCAM WEBSITE DETECTION

TECHNICAL FIELD

The present application generally relates to identifying scam websites, and more particularly to utilizing an automated domain crawler to identify new domains of websites that utilize redirections to other domains when attempting to conduct fraud.

BACKGROUND

An online service provider may provide services to users that may be utilized with websites and corresponding webpages. An online transaction processor may provide computing services associated with online shopping and transaction processing. These services may include those associated with processing transactions electronically when generated on merchant websites, as well as locating items, informing users of discounts and/or applying discounts, and engaging in other shopping and/or purchasing operations. Other service providers may provide similar or additional services that users interact with when on websites of merchants and/or other entities. The service providers may be trusted entities by customers and other end users when browsing online. Thus, users may view access to these services via certain websites as an implicit assurance that the website is valid and use of services and features on those websites will not be used to conduct fraud, such as fraudulent transaction processing for scam sales or items that defraud consumers.

However, scammers and other fraudulent or malicious merchants, parties, or other entities may setup accounts with service providers and access their computing services and functionalities available on the scammers third-party website. The scammers may create new websites that appear valid but are instead hosting fraudulent or scam items, transactions, and the like that may utilize the service provider's services to receive payments, obtain user and/or information, and the like. When customers interact with these websites, they may be scammed or have data compromised, accounts taken over, or the like, which results in disputes and/or account recovery and data security proceedings. Since these newly registered scam websites are not immediately detected, the scammers are able to proceed with transaction processing and other fraudulent or malicious conduct until sufficient disputes and/or alerts are filed. Thus, it is desirable for online service providers to provide proactive detection of scam websites to prevent computing attacks and fraudulent online activities in a faster and more efficient manner.

Figure 1:
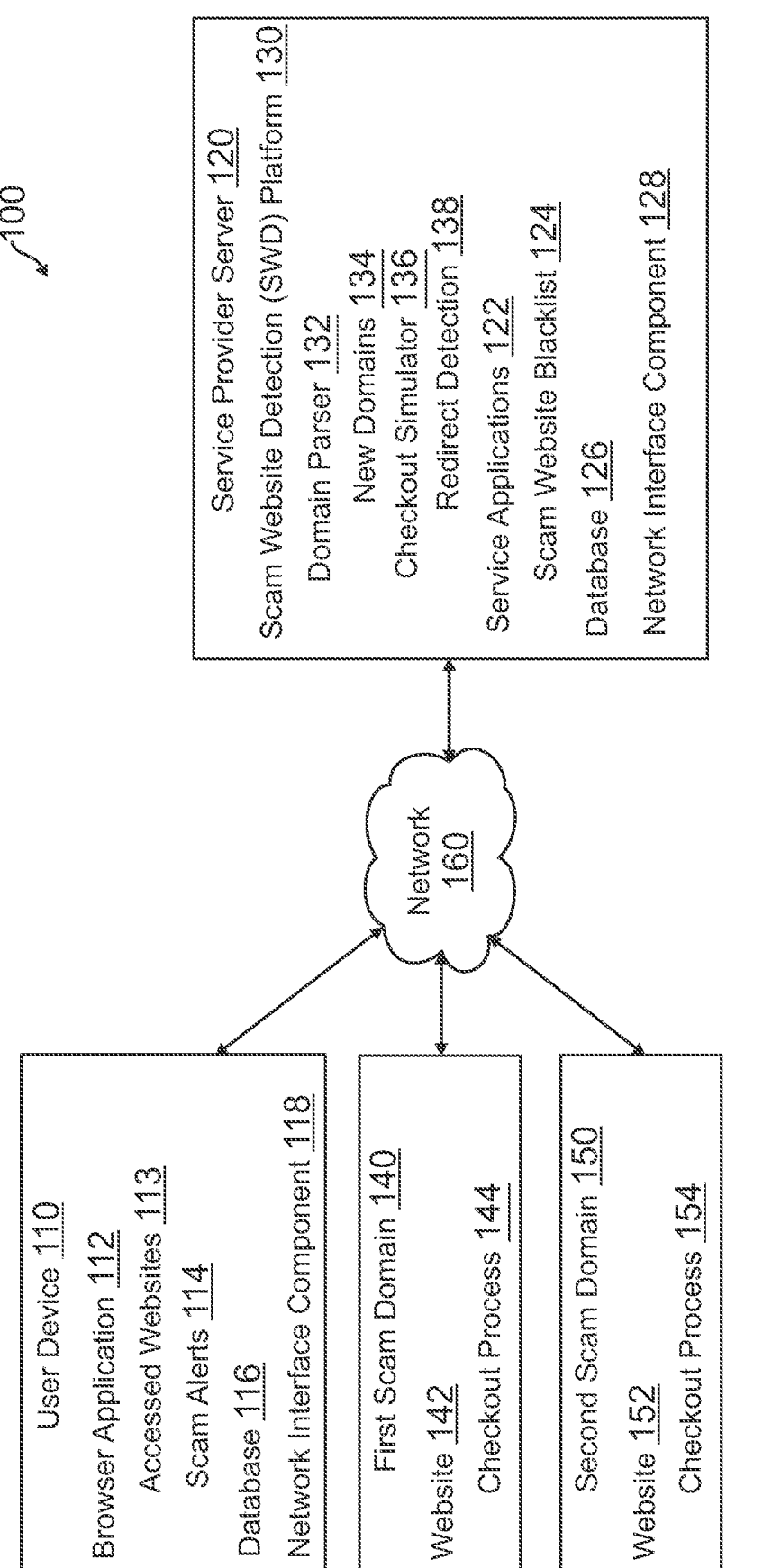
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for an automated domain crawler and checkout simulator for proactive and real-time scam website detection. Systems suitable for practicing methods of the present disclosure are also provided.

A service provider, such as PAYPAL® or other online transaction processor, may provide services associated with electronic transaction processing when checking out and paying for transactions electronically on merchant websites. To provide these services, the service provider may provide checkout options through software, embeddable webpages and/or interfaces, software development kits (SDKs), webpage and/or application code or code packages (e.g., files, data packages, code snippets, etc.), applications, and the like that may be utilized by merchants to provide the service provider's computing services through the merchant's external third-party websites and the like. This may enable the service provider to allow computing services to be hosted on other domains of websites owned and/or controlled by these merchants. Other service providers may also provide different computing services available on merchant websites including messaging, social media and networking, media playback and viewing, accounting, item cross-promotion and/or incentive programs, and the like. However, with the vast array of different websites, website constructions, and webpage layout, it is difficult for service provider to police and enforce usage of their computing services across many newly registered domains and newly created websites.

In this regard, scammers have become increasingly proficient at hosting fraudulent websites appearing valid for item sales, merchant marketplaces, and the like. For example, scammers may host scam websites that bait the customers into purchasing a product without fulfilling the order or providing poor quality products, misleading and substitute (e.g., inferior, knockoff, or fake) items, or the like. To entice users to purchase items, these fraudulent merchants may set up their account with a transaction processor or other service provider and register a new, albeit scam website that appears valid but redirects to another website and/or account when processing a transaction. When the customer places the order on the website, the money is transferred to the merchant's account, after which the merchant does not deliver the product or sends a counterfeit low-quality product. As a result, the customer files a dispute with the fraudulent merchant or the transaction or other service provider to receive chargeback, which typically does not result in the customer receiving funds back, while the fraudulent merchant exits the funds to their personal account.

In this regard, a service provider may provide a proactive and real-time scam website detection through an automated domain crawler of newly registered domains and simulated checkout or website feature usage to mimic or simulate a real user utilizing such checkouts, features, or other computing services provided for use by external websites. This allows for the service provider to identify websites that have been newly registered by merchants or other entities and that are using a feature, service, or the like provided by the service provider on these external websites. Further, by simulating an interaction with the feature, service, or the like, the service provider may identify redirects to other webpages that may have preexisting establishment of the processes for use with a particular account. As such, the domain hosting the redirection webpages may be analyzed to determine an account used or associated with this domain and if that account and/or domain has any flags, such as chargebacks, disputes, or other conflicts, reports, or alerts of malicious or fraudulent conduct. If so, the initial website and domain that was newly registered and/or provided by the merchant for use may similarly be flagged as a potential or identified fraudulent website and/or domain, thereby preventing or reducing fraud and harm to consumers and other end users.

In this regard, a user may wish to process a purchase of one or more items or services in a transaction. Selection of one or more items during an online transaction with a merchant website may require a payment instrument from the user for electronic transaction processing. A user may pay for one or more transactions using a digital wallet or other account with an online service provider or transaction processor (e.g., PAYPAL®), as well as the payment card (e.g., through proffering the physical card and reading card data or by entering card details and/or account numbers). An account and/or corresponding payment card with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments, which may be used to process transactions for items and digital gift cards (e.g., exact amount digital gift cards for detected transaction totals). The account creation may also be used to establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PAYPAL® or other online payment provider, may provide payments and the other transaction processing services.

Once the account of the user is established with the service provider, the user may utilize the account via one or more computing devices, such as a personal computer, tablet computer, mobile smart phone, or the like. The user may engage in one or more online or virtual interactions, such as browsing websites and data available with websites of merchants. The transaction processor or other service provider may provide features, services, and the like that may be used with these accounts, such as to process transactions and purchase items, on external third-party websites including those of merchants. To prevent or reduce fraudulent usage of these features and services, such as to reduce fraud conducted with these accounts, the transaction processor may establish a framework for a platform and applications that may include a domain crawler and a checkout simulator (or other similar feature or service interactor) elements or components, which may detect newly established scam websites and domains.

Initially, the service provider may set up this framework by training the domain crawler on new domain registrars and online resources where users and other entities may register new domains. The crawler may be configured to periodically, on a job execution schedule, or continuously monitor and/or detect new domain registrations, where the new domains may correspond to an online web and/or network address of a new website of an entity. The domain may therefore correspond to a website address and/or other necessary data for hosting, providing, and/or accessing the website. The domain crawler may further be configured to crawl the website of the new domain to detect if website elements, pages, and/or data includes an executable process or option associated with use of the service provider's features or services. If so, the checkout simulator or other feature/service interaction component may execute a simulated checkout or other use of the feature/service to check for redirections, and thereafter provide information of the redirections, such as a domain and/or corresponding website/account used in the redirections, for analysis of scam or fraud flags. As such, the checkout simulator may be trained and configured to input fake, proxy, or imitation checkout data, user data, financial data, or the like during use of the checkout process or other service/feature in order to proceed through the steps or pages of the processing flow on the newly established website. Further, this framework and/or applications and platform may execute in a recurring manner until the flow through the checkout or other feature/service use is complete and/or after a sufficient time period has passed to ensure later changes in redirections do not occur.

As such, the service provider may utilize the trained domain crawler or other monitoring application or component to detect new website creations through new domain registrations. The domain crawler may first identify new domain registration resources, such as online databases, websites, messages or notifications, and the like that report registration of online domains for websites. Using the domains, a web or network address for a corresponding website may be determined, which allows for crawling of the website. The domain crawler may operate by performing web browsing activities and/or interactions with a website and/or webpages of the website to determine content of the website including crawling, reviewing, and analyzing website data for options and processes to execute operations that are on or provided through such websites, which may be linked to checkout and/or payment services or other features and/or services provided by the service provider. For example, the domain crawler may include crawling logic and commands to browse websites and navigate between webpages and interfaces for determination of website data and embedded or provided options and processes on the website.

When analyzing website data after crawling, the domain crawler may determine if the website includes the aforementioned option or process to utilize the services or features provided by the service provider. For example, the crawler may identify webpage content, and thus if such content includes an option or process to utilize a service or feature of the service provider, by terms, code, identifiers, and/or other data, where terms such as "product", "total", "price", "description", as well as combinations of terms and/or sequences, such as "add-to-cart" and the like may indicate a checkout process. Other terms may also be used for websites different than merchant websites. An HTML attribute that is used for searching of the provided options and processes in HTML code for the webpages may also be used. For example, with HTML elements, the elements may have an attribute, type, or tag including "id" (e.g., a unique identifier), "class" (e.g., for classifying elements), "style", "title", and the like. Options and processes that may be utilized and/or interacted with may be determined from the webpage's document code and/or data. For example, the webpage may include fields, data, and the like for item or product information and images, item identifiers, digital shopping cart information and/or access, shipping information, billing information, a total, a coupon field, available coupons and coupon information, and the like.

If no process or option is provided that enables interactivity with the service provider via a feature or service that the service provider provides on external third-party websites, no further action may be taken and a recurring check and/or further iteration of domain crawling of the website and/or other new website may occur. However, if present, the domain and website may be added to a job or workflow bucket to run a simulated user experience of the process or option on the website, such as a simulated checkout using fake or imitation checkout data. This may include using a checkout simulator to perform actions including clicking a link, scrolling a page, searching for keywords/terms in a page, filling a webpage form and/or webpage fields, and the like, which may be used to carry out a processing flow for use of the service or feature on the website. During the processing flow, the checkout simulator may identify whether redirections to other webpages hosted by other domains occur such as navigation to a webpage of another website that may be previously registered and being used by a malicious entity masking their identity through the newly registered domain and website. As such, the checkout simulator may monitor for whether the checkout process, or other processing flow, navigates to another webpage hosted by another domain, such as whether there is an external navigation and/or if a domain name, website address, or the like changes. For example, a URL tracker and/or other domain tracker of the checkout simulator may identify when a website or domain address for a webpage used during the processing flow changes to a new or different domain. This may occur when a navigation (e.g., advancing through a flow, selecting a navigation, etc.) causes a change in webpages or other interfaces and redirects to another domain. Where no redirects are detected, the simulator may continue through the processing flow by performing recurring checks for the redirections and/or completing the flow, after which the website may remain unflagged and/or recurring checks of the website may be performed.

However, if a redirection occurs, the checkout simulator and/or another component of the automated framework for scam website detection may determine a domain and/or owner/controller of the domain that hosts the webpage and/or corresponding website. For example, a redirection may be to a webpage of a website that provides a checkout option to provide a payment to another account. Based on the webpage/website address or other webpage data, the component may perform a domain lookup and/or check. The domain may also indicate an owner or controller of the domain, an account used with the domain, or the like. Further, the domain may be cross-referenced to past account usages, payments, or the like, which may be used to identify an account and/or owner/controller of the domain. The component may also determine checkout data for the account to which a payment is to be made, such as a recipient account. Once the owner/controller and/or account is known, the service provider may determine if any flags or indications of scam websites, fraudulent transaction processing, sufficient chargebacks or disputes, or the like are present for the website used in the redirection, such as if multiple intermediary websites are being used to conduct fraud without the newly established merchant website being indicated in the frauds, disputes, or chargebacks. If there are flags to the redirected, intermediary, website, the new website causing the redirection to the potentially fraudulent and flagged webpage and/or account may also be flagged and/or reported. Flagging this website as potentially fraudulent may also include restricting or prohibiting electronic transaction processing on the newly flagged website. For example, restricting may include only allowing transactions under a certain limit or amount, while prohibiting may include preventing any transaction from being processed on the newly flagged website. Other restrictions may also be presented if a redirect occurs, such as limitations on account usage, data input, and/or transaction processing. Further, the website may be blocked or may be added to a blacklist or data repository of blocked or potential scam websites for cross-checking with future transactions when transaction are requested and/or users land on the website.

The checkout simulator or other component performing the automated test of the website's processing flow may continue to check for redirections over the course of the processing flow, and may analyze such redirections if/when they occur. After finishing a processing flow, the framework of the service provider may then perform recurring checks of the websites and/or newly registered domains in order to detect any changes and/or new registrations of domains for websites used to scam users or otherwise conduct fraud. As such, the service provider may provide an automated system to identify scam websites and other online risks of fraud and malicious computing attacks that users may be susceptible to when utilizing digital accounts over a network with remote users and entities. This provides a proactive approach to scam website detection, thereby providing faster and more responsive feedback to users of newly registered domains. Further, this increases computing security and provides more efficient approaches to cybersecurity with unknown websites by providing upfront and not retroactive scam website flags and indications. As such, the service provider may provide improvements to cybersecurity and fraud prevention systems.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers, may be combined or separated for a given embodiment and may be performed by a greater number or fewer number of devices and/or servers. One or more devices and/or servers may be operated and/or maintained by the same or different entities.

System 100 includes a user device 110, a service provider server 120, a first scam domain 140, and/or a second scam domain 150 in communication over a network 160. User device 110 may be used to process payments and/or engage in other computing services, such as through a payment or other computing service platform, application, and/or application extension, which may be facilitated through digital accounts and processing operations of service provider server 120. User device 110 may be utilized to browse different websites and engage in transaction processing, which may include websites hosted by first scam domain 140, second scam domain 150, and/or other domains hosting websites. In this regard, service provider server 120 may provide automated processes via a platform and/or framework to identify whether first scam domain 140 is hosting a scam website when newly registered based on redirections during checkout or other processing flow, such as redirections to second scam domain 150.

User device 110, service provider server 120, first scam domain 140, and/or second scam domain 150 may each include or be associated with one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

User device 110 may be implemented using any appropriate hardware and software configured for wired and/or wireless communication with service provider server 120 and/or websites 142 and/or 152. User device 110 may correspond to an individual user, consumer, or merchant that utilizes network 160 and platform provided by service provider server 120 for computing services including electronic transaction processing on different websites In various embodiments, user device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

User device 110 of FIG. 1 contains a browser application 112, a database 116, and a network interface component 118. Browser application 112 may correspond to executable processes, procedures, and/or applications with associated hardware. In other embodiments, user device 110 may include additional or different software as required.

Browser application 112 may correspond to one or more processes to execute modules and associated devices of user device 110 to provide a convenient interface to permit a user for user device 110 to browse webpages of websites including merchant websites and/or marketplaces where the user may engage in electronic transaction processing. In this regard, browser application 112 may correspond to specialized hardware and/or software utilized by user device 110 that may access websites 142 and/or 152, retrieve website and/or individual webpage data, display such data, allow interaction with and/or navigation between webpages and/or webpage data, and the like. In some embodiments, browser application 112 may be used to provide transaction processing for the items, such as through a user interface enabling the user to enter and/or view the items that the user associated with user device 110 wishes to purchase. This may be based on a transaction generated by browser application 112 using one or more merchant websites provided by one or more of first scam domain 140, second scam domain 150, and/or other domain hosting websites that may be used by valid and/or scam merchants. Browser application 112 may utilize user financial information, such as credit card data, bank account data, or other funding source data, as a payment instrument when providing payment information. Additionally, browser application 112 may utilize a digital wallet associated with an account with service provider server 120 as the payment instrument, for example, through accessing a digital wallet or account of a user through entry of authentication credentials and/or by providing a data token that allows for processing using the account. Browser application 112 may also be used to receive a receipt or other information based on transaction processing.

In various embodiments, browser application 112 may correspond to a general browser application configured to retrieve, present, and communicate information over the Internet (e.g., utilize resources on the World Wide Web) or a private network. For example, browser application 112 may provide a web browser, which may send and receive information over network 160, including retrieving website information, presenting the website information to the user, and/or communicating information to the website, including payment information for the transaction. However, in other embodiments, browser application 112 may include a dedicated application of service provider server 120 or other entity (e.g., a merchant), which may be configured to assist in browsing websites and/or processing transactions electronically, such as a mobile application on a mobile device. To protect from fraudulent transaction processing on scam websites, such as those hosted by first scam domain 140 and/or second scam domain 150, service provider server 120 may implement processes to detect when first scam domain 140 and/or second scam domain 150 host scam websites based on redirections to other webpages of scam websites, entities, and/or accounts, as discussed herein. As such, browser application 112 may receive notifications, alerts, and/or browser/website flags of scam websites and/or domains when browser application 112 is used to browse different websites and/or engage in electronic transaction processing.

User device 110 may further include database 116 which may include, for example, identifiers such as operating system registry entries, cookies associated with browser application 112 and/or other applications, identifiers associated with hardware of user device 110, or other appropriate identifiers. Identifiers in database 116 may be used by a payment/service provider to associate user device 110 with a particular account maintained by the payment/service provider.

User device 110 includes at least one network interface component 118 adapted to communicate with service provider server 120, first scam domain 140, second scam domain 150, and/or other servers, devices, and/or endpoints over network 160. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide operations for scam website detection through identification of webpage redirections during processing flows. Various embodiments of the system(s) described herein may be provided by service provider server 120 and may be accessible by user device 110 when accessing first scam domain 140 and/or second scam domain 150. Service provider server 120 includes one or more processing applications which may be configured to interact with user device 110, first scam domain 140, second scam domain 150, and/or other devices and servers. In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes a scam website detection (SWD) platform 130, service applications 122, a database 126, and a network interface component 128. SWD platform 130 and service applications 122 may correspond to executable processes, procedures, and/or applications with associated hardware. In other embodiments, service provider server 120 may include additional or different modules having specialized hardware and/or software as required.

SWD platform 130 may correspond to one or more processes to execute modules and associated specialized hardware of service provider server 120 to identify scam websites through redirections during checkout flows or other processing flows to other websites that may be affiliated with scam website flags or indications for corresponding accounts, domains, and/or entities. In this regard, SWD platform 130 may correspond to specialized hardware and/or software used by service provider server 120 to provide a domain parser 132 that may be trained and/or configured to detect new domains 134 from one or more domain registrars or other online resources that may include new registrations of domains (e.g., a database or other online domain registration resource that may be accessed, queries, called for data via API calls, etc.). When new domains 134 are detected, domain parser 132 may utilize an intelligent website content parsing operation, script, bot, AI engine, or the like to identify whether a checkout option or process is available on one or more webpages of the website, or other processing flow using the services and/or features of service provider server 120. This may include using rule-based, ML models, and/or NNs to identify checkout option/process (or other processing flow) data, indications, or the like on webpages. If detected, a checkout simulator 136 may be run with such options or processes to identify redirects through a redirect detection 138 during the processing flow. In some embodiments, domain parser 132 may also perform recurring or further checks of websites that have been newly registered over a time period to detect with the domain and/or website has added new content to a webpage, such as a landing page, that may indicate a checkout option, process, or other processing flow utilizing the services and features of service provider server 120.

Checkout simulator 136 may be invoked when a checkout option, process, or the like is detected on a website, such as one hosted by first scam domain 140 and/or second scam domain 150. In this regard, checkout simulator 136 may include one or more automated processes, such as through a bot application, process, or the like, that may mimic or imitate a user proceeding through the identified processing flow on the website. This may be done using faked or imitation customer, transaction, and/or financial information to appear real and advance through the steps or stages of the processing flow. During the processing flow, checkout simulator 136 may include redirect detection 138 to detect when the processing flow causes a navigation to an external or outside webpage of another domain and/or website. For example, redirect detection 138 may include a monitor and/or tracker that analyzes a webpage URL and/or other domain information for a current webpage that checkout simulator 136 is on at each step or operation of the processing flow. As the processing flow advances, such as when further input is provided and/or a step advances in the processing flow, the monitor/tracker may identify if the URL and/or domain information changes, and in particular, changes to a different domain. This different domain may be registered and hosting a different website and/or webpage(s) and checkout simulator 136 may therefore have been directed to another domain through URL and/or domain information monitoring.

When this occurs, checkout simulator 136 may determine a corresponding domain by identifying and/or extracting an online or network address and/or determining domain characteristics from webpage data and/or content. Checkout simulator 136 may further identify an account based on the domain and/or checkout redirection process during the processing flow. If this account, domain, and/or identified entity has been flagged or indicated as a potential or known fraudster, for example, based on disputes, chargebacks, or the like, the newly created webpage causing the redirections to other webpages may be identified.

Checkout simulator 136 and redirect detection 138 may be executed in a recurring manner so that newly registered domains and websites may be rechecked for changes, such as new additions, to webpages that may include redirections to other websites. This recurring execution may also be used to identify multiple different redirections to different websites and/or domains so that all or multiple different redirected websites and/or domains may be identified. SWD platform 130 may then be used to generate a whitelist and/or blacklist of valid and/or scam websites, such as a scam website blacklist 124 that may be used with service application 122 including a transaction processing application to limit transaction processing, provide alerts to users, flag websites and/or provide indications to users on websites, send notifications to users of new scam websites, and the like. Further, scam website blacklist 124 may be used to restrict or prohibit transactions from being processed on the newly flagged website, which may include only allowing transactions up to a certain amount or limit, as well as preventing all transaction processing from occurring on the website through service applications 122. The operations, components, and processes of domain parser 132 and checkout simulator 136 are discussed in further detail below with regard to FIGS. 2A-4.

In some embodiments, ML and other AI models, engines, rules, and/or systems may be trained for use with domain parser 132 and/or checkout simulator 136, such as to make identifications, predictions, and/or classifications from webpage data, browsing/crawling states, and/or activities during processing flows. For example, ML and other AI engines, models, rules, and the like may be used, in some embodiments, to train and determine content on websites including identifying checkout elements and/or processing flows, proceeding through checkouts and/or processing flows, identifying redirections, and the like. For example, ML engines may include AI models, such as ML or neural network (NN) models. AI models may generally correspond to any artificial intelligence that performs decision-making, such as rules-based engines and the like. However, AI models may also include subcategories, including ML models and NN models that instead provide intelligent decision-making using algorithmic relationships. Generally, NN may include deep learning models and the like, and may correspond to a subset of ML models that attempt to mimic human thinking by utilizing an assortment of different algorithms to model data through different graphs of neurons, where neurons include nodes of data representations based on the algorithms that may be interconnected with different nodes. ML models may similarly utilize one or more of these mathematical models, and similarly generate layers and connected nodes between layers in a similar manner to neurons of NN models.

When building ML models, training data may be used to generate one or more classifiers and provide recommendations, predictions, or other outputs based on those classifications and an ML model. Training data may be obtained from previous examples of domain redirects during checkout processing or other processing flows. In this regard, the training data may have classifiers and/or labeled data for identified checkout processes, options, or elements on websites, domain redirections during processing flows, and the like that may be used by the AI operations discussed herein. The training data may be used to determine input features for training predictive scores or outputs, which may be used to generate a decision, classification, rule execution, or the like associated with coding, generating, and/or updating of a pluggable module. This may allow for training of ML model associations, clusters, and/or layers. For example, NN and/or other ML models may include one or more layers, including an input layer, a hidden layer, and an output layer having one or more nodes, however, different layers may also be utilized. For example, as many hidden layers as necessary or appropriate may be utilized. Each node within a layer is connected to a node within an adjacent layer, where a set of input values may be used to generate one or more output scores or classifications. Within the input layer, each node may correspond to a distinct attribute or input data type that is used to train ML models.

Thereafter, the hidden layer may be trained with these attributes and corresponding weights using an ML algorithm, computation, and/or technique. For example, each of the nodes in the hidden layer generates a representation, which may include a mathematical ML computation (or algorithm) that produces a value based on the input values of the input nodes. The ML algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for the ML models that attempt to classify or identify a webpage resource, next state for a crawling operation or webpage, and the like. By providing training data to train ML models, the nodes in the hidden layer may be trained (adjusted) such that an optimal output (e.g., a classification) is produced in the output layer based on the training data. By continuously providing different sets of training data and penalizing ML models when the output of ML models is incorrect, ML models (and specifically, the representations of the nodes in the hidden layer) may be trained (adjusted) to improve its performance in data classification. Adjusting ML models may include adjusting the weights associated with each node in the hidden layer. Thus, when ML models are used to perform a predictive analysis and output, the input may provide a corresponding output based on the classifications trained for ML models.

Service applications 122 may correspond to one or more processes to execute modules and associated specialized hardware of service provider server 120 to process a transaction or provide other computing services to customers, merchants, and/or other end users and entities utilizing service provider server 120. In this regard, service applications 122 may correspond to specialized hardware and/or software used by service provider server 120 to provide computing services to users, devices, and applications, which may include electronic transaction processing and/or other computing services using accounts provided by service provider server 120. Service applications 122 may be used by users associated with user device 110 to establish user and/or payment accounts, as well as digital wallets, which may be used to process transactions. The digital accounts may be accessed and/or used through one or more instances of a web browser application and/or dedicated software application executed by user device 110 and/or other devices and servers to engage in computing services provided by service applications 122. Computing services of service applications 122 may also or instead correspond to messaging, social networking, media posting or sharing, microblogging, data browsing and searching, online shopping, and other services available through service provider server 120. Service applications 122 may therefore be used to request, view, process, and/or operate on data by user device 110. A user associated with user device 110 may establish an account with service applications 122 and/or access another account with service provider server 120. For example, an account provided by HONEY® may be provided by checkout monitoring and/or coupon entry application. A more general account (e.g., a PAYPAL® account) may also provide the aforementioned account services and be utilized during shopping and/or payment services.

Service applications 122 may be desired in particular embodiments to provide features to service provider server 120. For example, service applications 122 may include security applications for implementing server-side security features, programmatic client applications for interfacing with appropriate application programming interfaces (APIs) over network 160, or other types of applications. Service applications 122 may contain software programs, executable by a processor, including a graphical user interface (GUI), configured to provide an interface to the user when accessing service provider server 120 via one or more of user device 110, where the user or other users may interact with the GUI to view and communicate information more easily. Service applications 122 may include additional connection and/or communication applications, which may be utilized to communicate information to over network 160.

Service applications 122 may include a transaction processing application configured to provide electronic transaction processing accounts, services, and operations to users via applications, websites, and the like, including authentication and checkout services on merchant or other websites, as discussed herein. As such, service applications 122 may also include or utilize different processors, engines, or models as required for merchants to utilize when implementing functionalities, features, and services for authentication, electronic transaction processing, and the like on their websites, for example, through one or more platforms that may be integrated through different application programming interface (API) integrations to allow APIs of the platforms, services, and applications to exchange data. Service applications 122 may include one or more APIs that perform API calls and requests, and receive responses, in order to provide account services, electronic transaction processing, and the like on external websites including those of first scam domain 140 and/or second scam domain 150.

The transaction processing application may process a transaction or provide another payment service to merchants and customers of service provider server 120. The transaction processing application may be used by a user associated with user device 110 to establish a payment account and/or digital wallet, which may be used to process transactions. Financial information may be stored to the account, such as account/card numbers and information. A digital token for the account/wallet may be used to send and process payments, for example, through an interface provided by service provider server 120. The payment account may be accessed and/or used through a browser application/extension and/or dedicated payment application executed by user device 110 and engage in transaction processing through the transaction processing application. The transaction processing application may be used for authentication and/or checkout. When performing transaction processing and/or website browsing or item shopping, scam website blacklist 124 may be used to notify users of potential fraud, block or provide security and/or liability release during transaction processing, and the like. As such, scam website blacklist 124 may be used to notify or alert users of scam websites that are detected by SWD platform 130. Scam website blacklist 124 may also be used to restrict (e.g., only allow a certain level, amount, etc.) transaction processing on different websites and/or prohibit transaction processing on those websites. The transaction processing application may process the payment and may provide a transaction history for transaction authorization, approval, or denial.

Additionally, service provider server 120 includes database 126. Database 126 may store various identifiers associated with user device 110. Database 126 may also store account data for accounts 136, including payment instruments and authentication credentials, as well as transaction processing histories and data for processed transactions. Database 126 may store webpage data and/or resource data, including a repository associated with identified and/or verified websites and/or scam websites including scam website blacklist 124.

In various embodiments, service provider server 120 includes at least one network interface component 128 adapted to communicate user device 110, first scam domain 140, second scam domain 150, and/or another device/server for a merchant over network 160. Network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

First scam domain 140 and/or second scam domain 150 may correspond to domains (e.g., Internet address, name, location, identifier, or the like for a website) corresponding to online websites (e.g., a website 142 for first scam domain 140 and a website 152 for a second scam domain 150) that provide features, services, and other operations for website hosting. In this regard, websites 142 and 152 may provide information, computing services, products (e.g., items and/or services for sale), interactable features, and the like to users via online webpages. In some embodiments, one or more of first scam domain 140 and/or second scam domain 150 may be hosted, provided by, and/or utilized by a merchant, seller, or the like to advertise, market, sell, and/or provide items or services for sale, as well as provide checkout and payment. In this regard, first scam domain 140 and/or second scam domain 150 may be utilized by one or more scam merchants or other fraudulent or malicious entities to provide websites 142 and 152 that lure customers to fraudulent transaction processing and sales, such as for items that are not delivered, items that are misrepresented or counterfeit, or the like. To do this without appearing initially fraudulent, redirections may be used so that a newly registered domain and website may be unknown to users and/or services providers but redirect to a website during a processing flow that is preestablished and used to perpetrate the fraud. As such, a checkout process 144 on website 142 may redirect to a checkout process 154 on website 152.

For example, first scam domain 140 and/or second scam domain 150 may be used to host a website having one or more webpages that may be used by customers to browse items for sale and generate a transaction for one or more items. First scam domain 140 may provide checkout process 144, which may be utilized to pay for a transaction and initially appears valid as website 142 is not on any watchlists, flagged, or otherwise indicated as potentially fraudulent. In some embodiments, checkout process 144 may be provided by service provider server 120 based on one or more operations, SDKs, API standards or guidelines, and the like that may be implemented in the merchant website, which may allow for transaction processing, or may be provided by the scam merchant or other scammer/fraudulent entity. Checkout process 144 may be used to pay for a transaction using a payment instrument, including a credit/debit card, and account with service provider server 120, or the like. However, during use of checkout process 144, a redirection may occur to checkout process 154, which corresponds to the same or similar process but instead causes transaction processing to be effectuated to another account of the scam merchant. Thus, checkout process 154 may be preestablished and use the same or similar operations, SDKs, API standards or guidelines, and the like, but may instead be used to provide a payment to a particular account on a webpage of website 152 that is not initially visible and apparent through website 142 and/or checkout process 144.

Websites 142 and 152 may be utilized by customers and other end users to view one or more user interfaces, for example, via graphical user interfaces (GUIs) presented using an output display device of user device 110. These user interfaces may be used to navigate through items for sale on the merchant website, generate a transaction, and checkout for the transaction on the merchant website. Further, websites 142 and 152 may be processed and/or parsed to scrape and/or extract data (e.g., HTML/XML code and/or elements from HTML/XML/CSS documents for webpages) when viewing items, engaging in electronic transaction processing, or otherwise interacting with first scam domain 140 and/or second scam domain 150 to identify checkout processes 144 and 154. For example, with shopping and transaction processing, checkout processes 144 and 154 may include elements for authentication, login, items, coupons or savings entry, forms for shipping, billing, name, account identifier, fields identifying item total, sales tax, tip, shipping costs, etc., and the like. In other embodiments, webpage resources 144 may provide different webpage data and features. Other embodiments of first scam domain 140 and/or second scam domain 150 may include those used for other online services, interactions, and/or information, including those used for messaging, social networking, media posting or sharing, microblogging, data browsing and searching, news, information streaming or uploading, and the like.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2A:
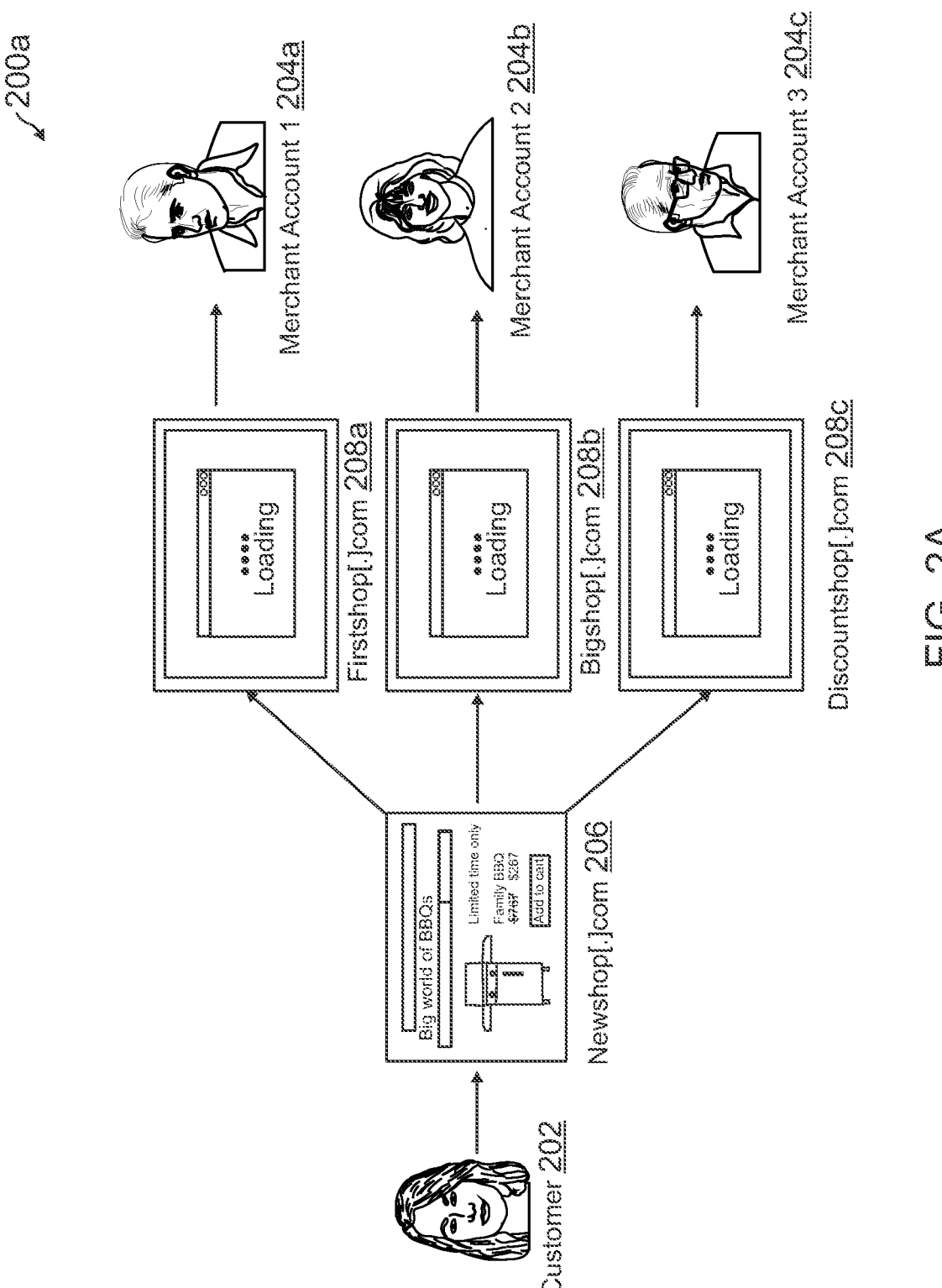
FIGS. 2A and 2B are diagrams of customers interacting with different websites that may include redirections to other scam websites used to perpetrate fraud on the customers, according to embodiments.
Figure 2B:
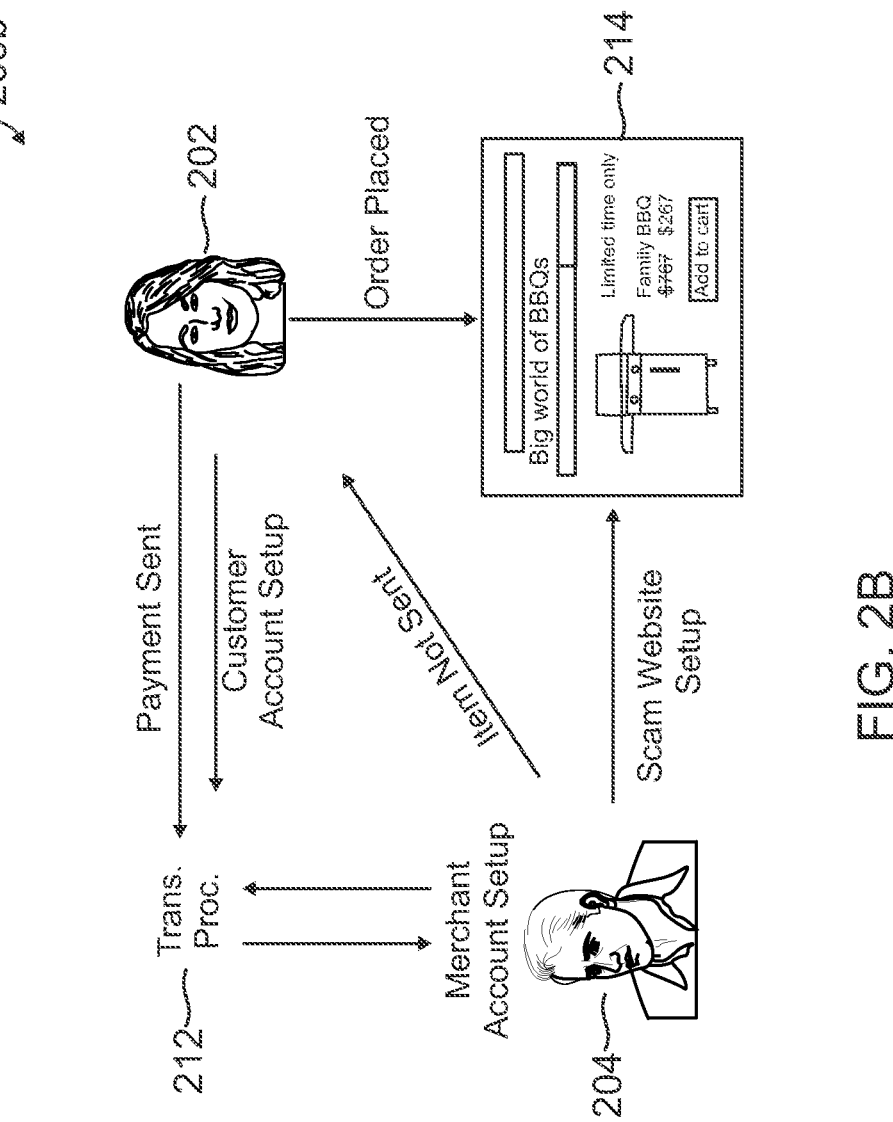

FIGS. 2A and 2B are diagrams 200*a* and 200*b* of customers interacting with different scam websites that may include redirections to other scam websites used to perpetrate fraud on the customers, according to embodiments. In this regard, a device, such as user device 110 in system 100 of FIG. 1, may be utilized by a customer 202 to access different websites including a new website 206 that may offer items for sale and engage in transaction processing with customer 202. As such, a service provider, such as service provider server 120 may detect scam websites to inform customer 202 of those scam websites, as well as restrict or prohibit transaction processing on those websites by customer 202.

Conventionally, a fraudster may launch a new scam website and multiple customers may then file disputes on transactions processed on the website when the scam occurs with such transactions, such as a failure to send goods or sending counterfeit goods. In such conventional scams, a service provider, such as an online transaction processor, may simply look at the return URL of each transaction, extract the corresponding website, and block any future transactions from that website. Simultaneously, the service provider may also restrict the merchant account receiving payments from the website. However, this approach only provides a temporary solution as scammers can easily evade it through intermediary websites and new domain registrations.

In diagram 200*a*, a merchant utilizing merchant accounts 204*a-c* launches the scam site shown as new website 206, followed by three intermediary websites having webpages used for transaction processing, shown as redirected webpages 208*a-c*. Moreover, the merchant also creates merchant accounts 204*a-c* with each account receiving payments from the corresponding one of redirected webpages 208*a-c*. As such, when customer 202 tries to checkout on new website 206, which is fraudulent, but may be trusted by providing a service or feature for checkout or other processing flow from the service provider, customer 202 is routed to one of redirected webpages 208*a-c* which shows a webpage being loaded. After effectuating a payment to a corresponding one of merchant accounts 204*a-c* from redirected webpages 20*a-c*, the merchant checks out and sends the payment to one of merchant accounts 204*a-c*. When customer 202 does not receive the purchase item, receives a counterfeit item, or otherwise identifies a scam or fraud, customer 202 may a dispute with the service provider. However, upon the service provider inspecting the return URL of the transaction, only one of redirected webpages 208*a-c* may be found and the corresponding one of merchant accounts 204*a-c*. The service provider may not have visibility into the actual scam website, as new website 206 has offloaded the fraud to redirected webpages 208*a-c*.

Referring now to FIG. 2B, in diagram 200*b*, a merchant 204, such as one setting up merchant accounts 204*a-c*, initially performs a merchant account setup of merchant accounts 204*a-c* with a transaction processor 212, which may provide account setups to merchants and customers, including customer 202, for processing digital transactions online and through websites. Customer 202 may further perform a customer account setup in order to purchase items from different websites or online marketplaces. In this regard, merchant 204, as a scammer, may setup a newly registered website 214 as described above to have redirections during transaction processing through a checkout flow to other webpages of intermediary websites. On setup, customer 202 may then place an order with newly registered website 214 and request a payment be sent to merchant 204 when arriving at an intermediary webpage from a redirection. However, merchant 204 then does not send the item. While customer 202 may report and dispute the transaction, only the intermediary website is identified and not newly registered website 214.

As a result, in diagram 200*b*, merchant 204 keeps setting up intermediary sites (along with rotating merchant accounts 204*a-c* and/or establishing new and rotating in new merchant accounts) and continues to deceive customers. This unique redirection capability remains a major hindrance in combatting the prevalence of scam websites. As such, when the scam websites pose as legitimate websites, they may be able to advertise on social media platforms and the like without being detected by transaction processor 212. As such, transaction processor 212 may train and implement an automated system that may operate with the components in diagrams 200*a* and 200*b*, as shown in the following FIGS. 3A and 3B. For example, transaction processor 212 may track newly registered websites with checkout button, options, or processes, simulate the customer experience through checkout by conducting shadow or simulated checkouts, and uncover website redirection and merchant account rotation to label the newly registered website 214 as a scam website.

Figure 3A:
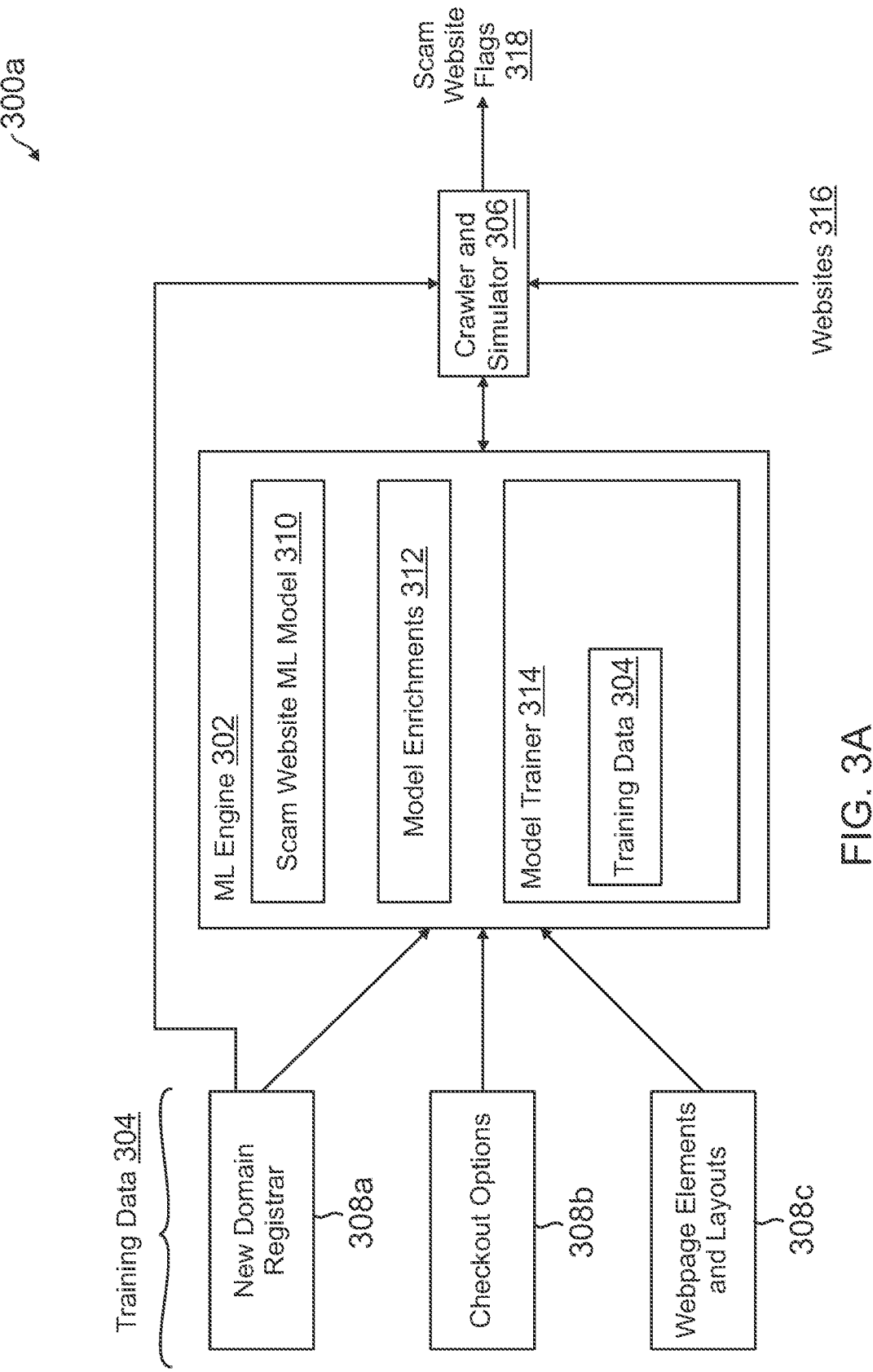
FIGS. 3A and 3B are system environments used to provide an automated domain crawler and checkout simulator for detection of scam websites based on newly registered domains for websites having redirections to other scam websites, according to an embodiment.
Figure 3B:
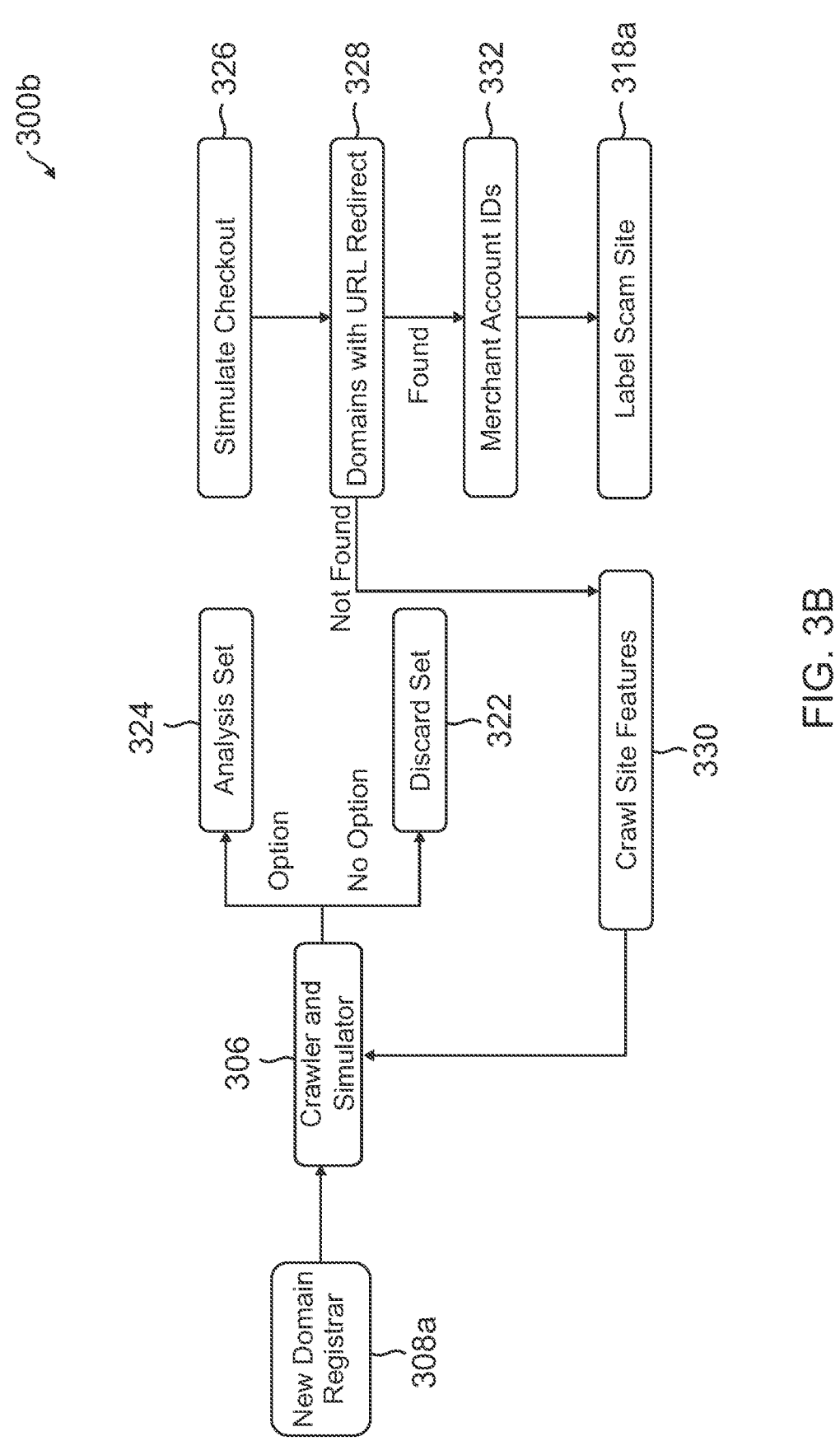

FIGS. 3A and 3B are system environments 300*a* and 300*b* used to provide an automated domain crawler and checkout simulator for detection of scam websites based on newly registered domains for websites having redirections to other scam websites, according to an embodiment. As such, the service provider may provide a system where the interactions by customer 202 in FIGS. 2A and 2B with the websites provided by merchant 204 may be automated and imitated in order to identify fraud websites through the redirections to the intermediary websites where the merchant processes fraudulent transaction.

For example, referring to diagram 300*a* of FIG. 3A, the service provider may train an ML engine for intelligent detection and crawling of new websites when domains are registered. System environment 300*a* includes ML engine 302, which may correspond generally to the components and operations provided by SWD platform 130 for domain parser 132 and checkout simulator 136 discussed in reference to system 100 of FIG. 1. System environment 300*a* may correspond to a system for crawling webpages on web websites once trained in order to identify scam websites. To train and/or configure ML engine 302 to provide a crawler and simulator 306 for new website identification, parsing, and determination of scam website indications or flags, training data 304 may be provided to ML engine 302. Training data 304 may include data, such as identifying data, associated with new domain registrar 308*a*, checkout options 308*b*, and webpage elements and layouts 308*c*.

New domain registrar 308a may correspond to an online data resource where new domains may be registered for use with corresponding websites, which may be queries and/or regularly provide updates on new registrations. Checkout options 308b may correspond to different available checkout options and/or processes that a service provider may provide for use on external third-party websites. In this regard, checkout options 308b may include data usable to identify processing flows for the service and/or features that may implemented by merchants or other entities from the service provider, such as text, executable processes and option layouts or configurations, and/or graphics from SDKs, code packages, pages or interfaces, and the like. Similarly, webpage elements and layouts 308c may include components and elements on webpages of websites so that different elements may be extracted and identified during parsing of website data. As such, checkout options 308b and webpage elements and layouts 308c may be used to identify checkout options and processing flows on webpages, as well as use those processing flows during a simulated execution to determine whether redirections occur.

In system environment 300a, ML engine 302 may then train and implement scam website ML models 310, which may be configured to identify scam websites. This may be done though identifying new domain registrations, and parsing websites from those domains for checkout elements and other processing flows. Scam website ML models 310 may include those for crawler and simulator 306 to parse through new websites and bucket those that have checkout options or the like for further analysis during a simulated experience for redirections to intermediary webpages that may be used to perpetrate fraud and scams. Scam website ML models 310 may further include models used during simulated experiences and uses of checkouts or other processing flows. To execute scam website ML models 310, model enrichments 312 may be used to enrich model processes for scam website detection. In this regard, model enrichments 312 may include data, processes, models, and the like used for detection of checkout options and other processing flows on websites. Model enrichments 312 may further include those used for executing simulated checkouts and other experiences, including those that may be used to detect domain redirections to a new domain when a webpage redirection or navigation occurs during a processing flows.

As such, to train scam website ML models 310 with model enrichments 312, model trainer 314 may be used with training data 304. Model trainer 314 may therefore include a rule-based, ML model-based, and/or NN-based trainer, which may take input data from training data 304 and determine features and the like for rule, ML model, and/or NN creation and configuration. As such, model trainer 314 may include one or more rule or algorithmic model trainer, which may be used to train and configure domain crawler 316 to crawl new domains and execute simulated checkouts in a manner similar to customer 202. For example, domain crawler 316 may access newly registered website 214 when registered from websites 316, which may be identified by new domain registrar 308a and other online resources for new registrations. During crawling of newly registered website 214, detection of a checkout option may occur. Crawler and simulator 306 may then simulate a usage of the checkout option, such as on website 206 where navigation and/or redirection to one of redirected webpages 208a-c may occur. This allows for crawler and simulator 306 to generate scam website flags 318 based on associations between redirected websites 308a-c and past indications or flags of fraud. Scam website flags 318 may lag website 206 and/or newly registered website 214 based on redirections to redirected webpages 208a-c that are or were flagged for scams or other fraud.

Referring now to FIG. 3B, in system environment 300b, operations of crawler and simulator 306 are shown in further detail when detecting redirected webpages 208a-c are used during a processing flow, such as a checkout experience, via website 206 and/or newly registered website 214. For example, new domain registrar 308c may be accessed by crawler and simulator 306 in order to determine any new domain registrations and identify new websites associated with those domains. As such, new domain registrar 308c may correspond to an accessible online resource where domains are registered and therefore designate addresses of new websites that are available for users to browse. Thereafter, crawler and simulator 306 may determine if each new website from new domain registrar 308c has or does not have a checkout option or other processing flow associated with the service provider. This allows for bucketing of those websites into categories or buckets for those having processing flows and those not having processing flows of the service provider. If no checkout option or the like is found by crawler and simulator 306, those websites may be provided into a bucket for a discard set 322, which then are discarded and/or further processing for scam website detection is not required by crawler and simulator 306.

However, if a checkout option or the like is found, crawler and simulator 306 may bucket those websites into an analysis set 324. Analysis set 324 may therefore correspond to new websites that may be using and/or providing the services, features, or the like of the service provider through one or more processing flows, such as a checkout experience, on that website. As such, crawler and simulator 306 may proceed to perform a simulated checkout 326, which may proceed through the steps, stages, inputs, and navigations of the checkout or other processing flow. During the processing flow, crawler and simulator 306 may monitor for domains with URL redirects 328, which may indicate a domain change to a different domain and therefore corresponding one of redirected webpages 308a-c. If not found, crawler and simulator 306 may continue to perform a site feature crawl 330, which may perform a recurring analysis of website data and corresponding features or elements of websites for processing flow use and/or redirections to redirected webpages 308a-c.

However, if intermediary websites and/or URLs are detected, such as if redirections to redirected webpages 308a-c occur, merchant account IDs 332 are then found or determined from domains with URL redirects 328. This may be determined from the past transactions processed in association with the new domains, such as based on transaction histories that include transaction data, metadata, or the like that includes URLs, domain identification, and the like for redirected webpages 308a-c. Once identified, merchant account IDs 332 may be processed to determine if scam website flags, disputes and/or chargebacks occur, and the like may be found for those merchant accounts. If so, scam website labeling 318a, such as those that may be perform for scam website flags 318, may be provided to designate website 206 and/or newly registered website 214 as fraudulent or a scam.

Figure 4:
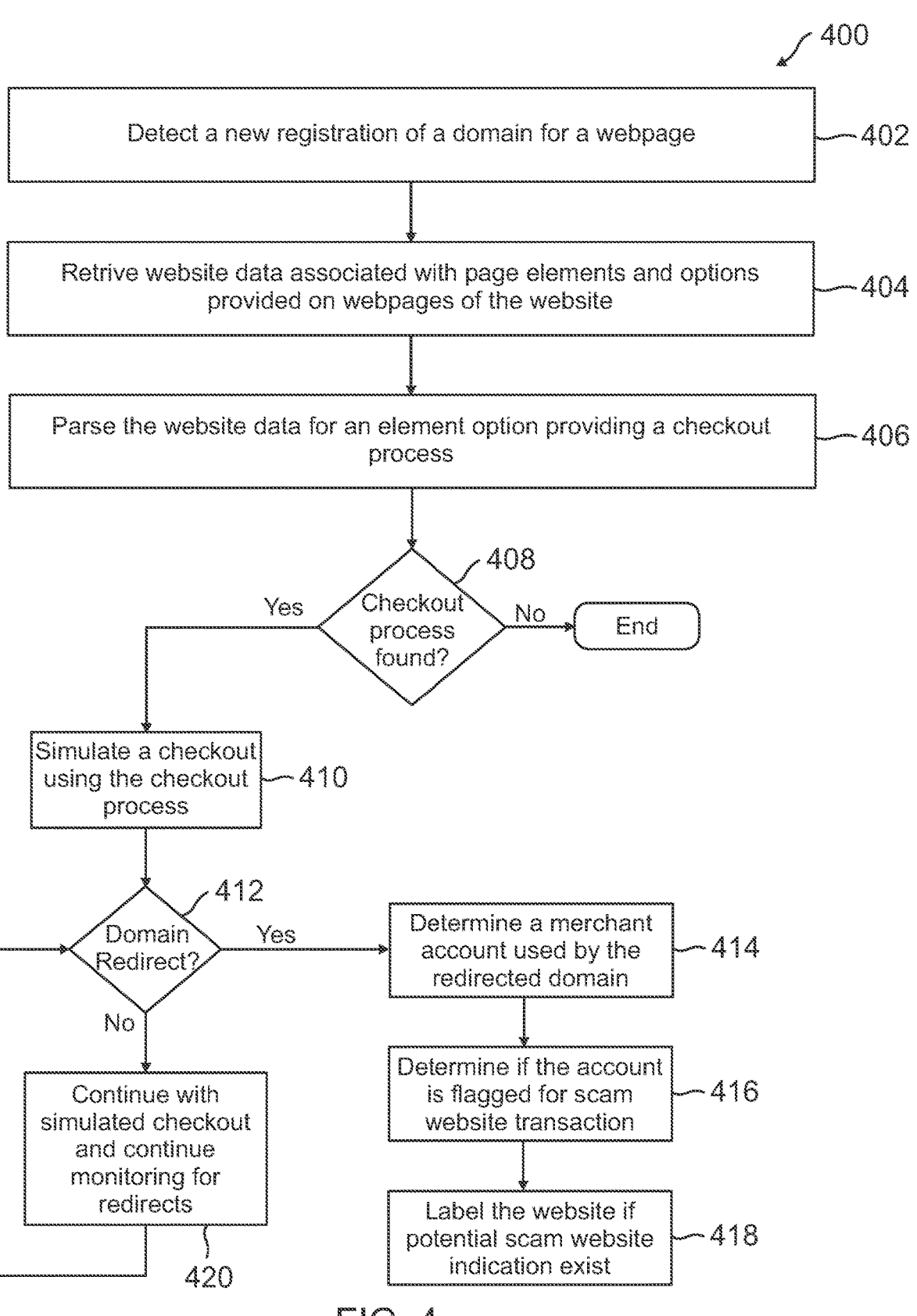
FIG. 4 is a flowchart for an automated domain crawler and checkout simulator for proactive and real-time scam website detection, according to an embodiment.

FIG. 4 is a flowchart 400 for an automated domain crawler and checkout simulator for proactive and real-time scam website detection, according to an embodiment. Note that one or more steps, processes, and methods described herein of flowchart 400 may be omitted, performed in a different sequence, or combined as desired or appropriate.

At step 402 of flowchart 400, a new registration of a domain for a webpage is detected. This may be detected based on parsing, querying, reading records from, and/or receiving new domain registrations from an online registrar or other resource for new domain registrations and/or website creations. A domain parser may perform the detecting based on API integrations with these domain registration resources and may therefore determine data records that include domains for websites. The websites may include website content on different webpages, which may be analyzed for scam websites and/or transaction conduct and/or likelihood.

At step 404, website data associated with page elements and options provided on webpages of the website is retrieved. The website data may correspond to one or more files or documents for webpage code, which may include identifiers and/or other data for identification of webpage elements, features, options, processes, and presentable data. The website data may be accessed from one or more webpages of a website accessed by a browser application and/or domain crawler, which may be browsed, crawled, or the like to identify content on the website. The website content may then be extracted for analysis and/or analyzed while crawling.

At step 406, the website data is parsed for an element or option providing a checkout process. For example, the domain parser may correspond to executable code, AI models, and/or scripts that crawl, scan, and/or parse such webpages for website data and corresponding checkout elements, options, or processes, or other processing flows accessible through the website to use services and/or features of a service provider. The modules may parse webpage code and/or DOM trees to identify webpage elements, identifiers, and code snippets associated with checkouts and other processing flows. Further, identifiers, graphics, input fields or menus, and the like may be indicators of checkout processes and other processing flows.

At step 408, it is determined whether the checkout process is found. If not, flowchart 400 ends. However, if so, flowchart 400 proceeds to step 410, where a checkout is simulated using the checkout process. A checkout simulator may be used to perform a simulated checkout or other use of a processing flow on the website and advance through the steps of the flow. The checkout simulator may utilize simulated data for a user or other checkout experience, such as simulated transaction and/or financial data, and the like, which may allow advancing through the flow. During this flow, the checkout simulator may also look for redirections to other external webpages of other domains, such as a domain redirections in an address bar or field during checkout processing.

At step 412, it is determined whether there is a domain redirect during the checkout process. That may be determined by identifying any changes to the domain, website address, or the like during navigations and/or changes of interfaces and webpages during the checkout flow. If yes, at step 414, a merchant account used by the redirected domain is determined. The merchant account may be determined by correlating the redirected domain to an account that has been used on, with, or to process transactions through that domain. For example, different accounts may show different domains on which payments were made or received, which may indicate their associations with such domains. Further, the accounts may also be registered with the domains to conduct business and/or process transactions, which allows for account lookup using the domains.

At step 416, it is determined if the account is flagged for a scam website transaction or other indication. Accounts may be flagged based on chargebacks, disputes, fraud investigations, and the like. While individual new websites may not have any or may have few indications of fraud, fraudsters may utilize multiple different intermediary websites to process transactions fraudulently, which may be banned or flagged as a bad actor and/or fraudster without the service provider identifying and/or having knowledge of the new website perpetrating the fraud through the redirections. However, certain accounts and/or owners of such accounts may have many indications of bad or fraudulent actions. As such, individual dispute, fraud, or chargeback flags from these many intermediary redirected flags may be aggregated into a larger indication of potential fraud by the newly created website using these intermediary websites for transaction processing when such websites are correlated by their used accounts and/or entities. Thus, at step 418, the website is labeled if the potential scam website indication exists. If sufficient flags or other indications exist, such as if meeting or exceeding a threshold number, percentage of transactions, or the like, the website and hosting domain that was newly registered and uses a processing flow that redirects to another webpage may similarly be flagged. This allows for proactive and real-time scam website detection on new registrations of domains and websites.

However, if at step 412, no domain redirect is determined at a particular step or operation of the checkout process, flowchart 400 proceeds to step 420 where the simulated checkout is continued with monitoring for further redirects. This may then return to step 412 where any domain redirects are detected and/or determined, which causes a recurring cycle until a domain redirect is identified and/or the checkout process completes. Further, if the checkout process completes with a redirection, or with a valid redirection that does not navigate to a webpage associated with a scam domain, website, and/or account, then flowchart 400 may repeat at a later time when the website is again checked in a recurring manner until it is determined that no new elements or content has been added that may include the redirects and/or the website is trusted.

Figure 5:
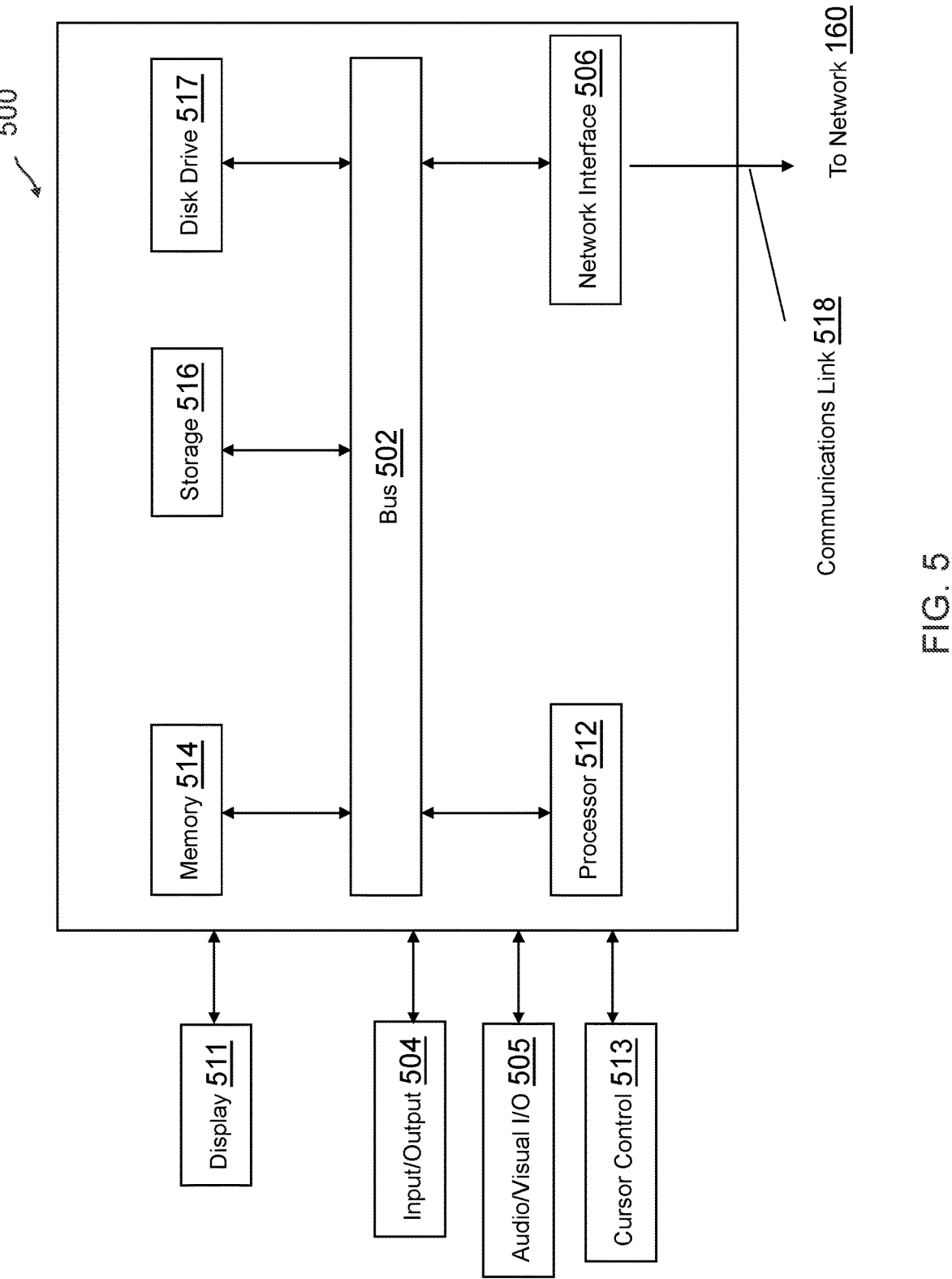
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, images, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including tele-communications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. For example, while the description focuses on gift cards, other types of funding sources that can be used to fund a transaction and provide additional value for their purchase are also within the scope of various embodiments of the invention. Thus, the present disclosure is limited only by the claims.

What is claimed is:

1. A service provider system comprising:

a non-transitory memory; and one or more hardware processors coupled to the non-transitory memory and configured to read instructions from the non-transitory memory to cause the service provider system to perform operations comprising:

requesting website registration data from a domain registration resource by a domain crawler;

receiving website data for a website by the domain crawler based on a new registration of a first domain for the website from the website registration data, wherein the website data includes a checkout process on the website;

executing, based on the new registration, a simulated checkout on the website using a checkout simulator and the website data, wherein the simulated checkout is executed by the checkout simulator, and wherein the executing the simulated checkout comprises:

utilizing imitation checkout data with the checkout process on the website, and determining that the checkout process includes a navigation to a checkout webpage;

causing the website to navigate to the checkout webpage based on an interaction by the checkout simulator with the checkout process;

detecting a domain change from the first domain to a second domain based on the navigation;

determining an account associated with the second domain;

determining whether there is a scam website indication for the first website based on the domain change and the account;

labeling the first domain for the first website based on whether there is the scam website indication; and storing the labeled first domain for the website by a data repository that enables fraud alerting with one or more future transactions requested to be processed via the website.

2. The service provider system of claim 1, wherein, prior to the executing the simulated checkout, the operations further comprise:

determining, from the website data, website content on at least a landing webpage of the website; and parsing the website content for the checkout process, wherein the executing the simulated checkout is performed after the parsing.

3. The service provider system of claim 2, wherein the parsing comprises:

crawling the website for the website content; and marking the website for the simulated checkout based on the crawling.

4. The service provider system of claim 1, wherein the receiving the website data comprises:

detecting the new registration of the first domain with a domain registration resource by the domain crawler based on crawling the website registration data; and retrieving the website data for the website via the first domain.

5. The service provider system of claim 1, wherein the operations further comprise:

monitoring the first domain to determine whether the first domain has added new website content to a landing page on the website.

6. The service provider system of claim 1, wherein the detecting the domain change is based on a redirection from the website to the checkout webpage hosted on the second domain.

7. The service provider system of claim 6, wherein the detecting the domain change comprises:

proceeding through a plurality of processing steps in a checkout flow for the checkout process on the website using the simulated checkout, wherein, at each of the plurality of processing steps, the checkout simulator monitors for a redirection to the checkout webpage; and identifying the redirection to the checkout webpage by the checkout simulator when monitoring, by the checkout simulator, for the redirection.

8. The service provider system of claim 6, wherein the operations further comprise:

executing a feedback loop for a scam website database that labels the website with the scam website indication and at least one other website with the scam website indication based on at least one of a use of the account associated with the second domain or a corresponding redirection of the at least one other website to the checkout webpage hosted on the second domain.

9. The service provider system of claim 1, wherein the first domain is labeled with the scam website indication and the first website is labeled as a scam website, and wherein the operations further comprise:

in response to the labeling, restricting or prohibiting electronic transaction processing for the one or more future transaction performed via the website or using the account based on the labeled first domain stored by the data repository.

10. The service provider system of claim 1, wherein the first domain comprises a uniform resource locator (URL) for the website and the website data for the website includes content hosted by the first domain on the website.

11. A method comprising:

requesting website registration data for at least a website by a domain crawler of a service provider system;

detecting a registration of a first domain for the website by the domain crawler from the website registration data;

retrieving website data for the website using the first domain;

parsing the website data for a checkout option on the website;

performing a simulated checkout on the website using the checkout option, wherein the performing the simulated checkout comprises:

utilizing simulated transaction processing data with the checkout option on the website for the simulated checkout, and determining that the checkout option includes a navigation to a checkout webpage;

detecting that the simulated checkout causes a redirection from the website to the checkout webpage associated with a second domain based on the navigation;

determining a merchant account with the service provider system that is associated with the second domain;

determining that at least one of the second domain or the merchant account has a scam website flag from past transaction processing;

storing a label indicating the scam website flag for the first domain for the website by a data repository for fraud alerting with transaction processing requests to be processed via the website; and restricting the transaction processing requests incoming from the first domain based on the label stored by the data repository.

12. The method of claim 11, further comprising:

adding the first domain and the website to a scam website blacklist usable with a plurality of computing devices for the restricting the transaction processing requests.

13. The method of claim 12, further comprising:

providing the scam website blacklist to a transaction processing platform.

14. The method of claim 13, further comprising:

updating, using a feedback loop, the scam website blacklist to label at least one other website with the scam website flag based on a connection with at least one of the merchant account or the checkout webpage of the second domain.

15. The method of claim 11, wherein the parsing the website data includes:

determining that the website data includes the checkout option; and adding the website data to a workflow bucket for the checkout simulator, wherein additional website data for an additional website is discarded from the workflow bucket if the additional website data does not include the checkout option, and wherein the workflow bucket is designated for a periodic processing job that performs the simulated checkout.

16. The method of claim 15, further comprising:

processing, in a procedural loop through checkout processing steps in a checkout processing flow for the checkout option, simulated checkouts for each website in the workflow bucket, wherein the processing monitors for redirections to external webpages at each of the checkout processing steps during the simulated checkouts.

17. The method of claim 11, wherein the determining the merchant account comprises performing a transaction processing history lookup using an identifier of the second domain for the past transaction processing performed using the merchant account.

18. A transaction processor system comprising:

a non-transitory memory; and one or more hardware processors coupled to the non-transitory memory and configured to read instructions from the non-transitory memory to cause the transaction processor system to perform operations comprising:

determining a new domain registration resource for new domains of websites by a domain crawling process of the transaction processor system;

requesting website registration data for merchant websites by the domain crawling process;

determining the new domains of the websites by the domain crawling process based on the website registration data;

determining webpage elements associated with a checkout option provided on the merchant websites based on available website checkout processes of the transaction processor system;

identifying scam website flags for merchant accounts that are associated with past transaction processing that include indications of fraud;

accessing a computing system including the domain crawling process and a checkout simulation process using the webpage elements and the scam website flags;

crawling, using the domain crawling process, the websites of the new domains when registered or after being registered to identify a subset of the websites including the checkout option using the webpage elements;

identifying, using the checkout simulation process, whether one or more of the websites are associated with one or more of the scam website flags during a redirection to one or more different domains from of the checkout option, wherein the identifying whether the one or more of the websites are associated with the one or more of the scam website flags comprises:

utilizing imitation checkout data with the checkout option on the one or more of the websites, and determining that the checkout option includes the redirection to one or more different webpages of the one or more different domains; and storing the one or more of the scam website flags for the one or more of the websites with a data repository.

19. The transaction processor system of claim 18, wherein the identifying includes:

executing a first step of a processing flow for the checkout option of each of the websites;

checking for the redirection to the one or more webpages when executing the first step; and repeating the executing and the checking for each subsequent step of the processing flow.

20. The transaction processor system of claim 19, wherein the operations further comprise:

executing a feedback process that labels at least one of the websites with one of the scam website flags based on an association with a webpage for another one of the websites having the redirection or an account used by the other one of the websites.

* * * * *